(12) United States Patent
Takayasu et al.

(10) Patent No.: US 8,779,305 B2
(45) Date of Patent: *Jul. 15, 2014

(54) PASSENGER'S WEIGHT MEASUREMENT DEVICE FOR VEHICLE SEAT HAVING IMPROVED EASE OF ASSEMBLY

(75) Inventors: Wataru Takayasu, Shioya-gun (JP);
Shinya Ishima, Shioya-gun (JP);
Shigeru Endo, Shioya-gun (JP); Kenji Sato, Sakura (JP)

(73) Assignee: TS Tech Co., Ltd., Asaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/588,922

(22) Filed: Nov. 2, 2009

(65) Prior Publication Data
US 2010/0044117 A1 Feb. 25, 2010

Related U.S. Application Data

(63) Continuation of application No. 11/992,418, filed as application No. PCT/JP2006/319479 on Sep. 29, 2006, now Pat. No. 8,051,941.

(30) Foreign Application Priority Data

Sep. 30, 2005 (JP) ................................ 2005-286881

(51) Int. Cl.
*B60R 21/015* (2006.01)
*B60N 2/44* (2006.01)
*B60N 2/06* (2006.01)
*G01G 19/08* (2006.01)

(52) U.S. Cl.
USPC ........... 177/136; 177/144; 180/273; 280/735; 296/68.1

(58) Field of Classification Search
USPC ........... 296/65.13, 68.1, 65.14; 177/136, 144; 73/862.621–862.632; 180/273; 280/735
See application file for complete search history.

(56) References Cited

U.S. PATENT DOCUMENTS

| 1,679,620 | A | 8/1928 | Moore |
| 4,178,037 | A | 12/1979 | Pickles |

(Continued)

FOREIGN PATENT DOCUMENTS

| DE | 103 15 400 A1 | 10/2004 |
| GB | 2 415 787 A | 1/2006 |

(Continued)

OTHER PUBLICATIONS

"Radius" from eFunda Design Standards website, Copyright 2010 by eFunda, Inc. (http://www.efunda.com/designstandards/plastic_design/radius.cfm).*

(Continued)

*Primary Examiner* — Randy W Gibson
(74) *Attorney, Agent, or Firm* — Oliff PLC

(57) ABSTRACT

An upper rail is movable in a rear and front direction with respect to a lower rail fixed to a vehicle floor. A load sensor is fixed to an upper surface of the upper rail, and a rectangular frame 30 is attached onto the load sensor. A rod of the load sensor sequentially penetrates a web of the rectangular frame, a plain washer and a spring holder upward, and a coil spring is wound around the rod. A bush is fitted to an edge of a hole of the plain washer, and a step difference is formed between an upper surface of the plain washer and the bush. A nut is screwed to the rod, and the nut tightens a bottom of a cup portion of the spring holder. In such a way, the coil spring is sandwiched between the spring holder and the web and is compressed, and an end portion of the coil spring engages with the step difference.

85 Claims, 7 Drawing Sheets

(56) References Cited

U.S. PATENT DOCUMENTS

| | | | |
|---|---|---|---|
| 4,182,255 A * | 1/1980 | Reid | 114/126 |
| 4,209,198 A | 6/1980 | Apple, Sr. | |
| 4,281,443 A * | 8/1981 | Threlfall | 29/271 |
| 4,353,565 A * | 10/1982 | Smith et al. | 280/149.2 |
| 4,597,552 A | 7/1986 | Nishino | |
| 5,110,177 A * | 5/1992 | Akio | 296/187.11 |
| 5,286,076 A * | 2/1994 | DeVoss et al. | 296/65.14 |
| 5,308,148 A | 5/1994 | Peterson et al. | |
| 5,421,124 A | 6/1995 | Zuccaro | |
| 5,478,975 A | 12/1995 | Ford | |
| 5,492,388 A | 2/1996 | Kawasaki | |
| 5,600,104 A | 2/1997 | McCauley et al. | |
| 5,714,695 A | 2/1998 | Bruns | |
| 5,921,624 A | 7/1999 | Wu | |
| 5,942,695 A | 8/1999 | Verma et al. | |
| 5,991,676 A | 11/1999 | Podoloff et al. | |
| 6,039,344 A | 3/2000 | Mehney et al. | |
| 6,050,635 A | 4/2000 | Pajon et al. | |
| 6,089,478 A * | 7/2000 | Truan et al. | 239/675 |
| 6,145,909 A | 11/2000 | Staley et al. | |
| 6,150,619 A | 11/2000 | Borngasser | |
| 6,176,543 B1 | 1/2001 | Nawata et al. | |
| 6,231,076 B1 * | 5/2001 | Blakesley et al. | 280/735 |
| 6,242,701 B1 | 6/2001 | Breed et al. | |
| 6,356,200 B1 | 3/2002 | Hamada et al. | |
| 6,367,859 B1 | 4/2002 | Flory et al. | |
| 6,405,987 B1 | 6/2002 | Andrigo et al. | |
| 6,499,360 B1 | 12/2002 | Bruns | |
| 6,520,023 B2 | 2/2003 | Kimura | |
| 6,555,765 B2 | 4/2003 | Paine | |
| 6,559,392 B1 | 5/2003 | Haynes et al. | |
| 6,616,239 B2 | 9/2003 | Guillot | |
| 6,637,824 B1 * | 10/2003 | Yokota | 297/452.18 |
| 6,644,903 B1 | 11/2003 | Arand | |
| 6,661,341 B2 | 12/2003 | Masuda et al. | |
| 6,677,539 B2 | 1/2004 | Miura et al. | |
| 6,682,146 B2 | 1/2004 | Minai | |
| 6,684,718 B2 | 2/2004 | Muraishi | |
| 6,695,379 B1 * | 2/2004 | Ishida | 296/65.14 |
| 6,702,376 B1 | 3/2004 | Shen | |
| 6,772,985 B2 * | 8/2004 | Lee | 248/424 |
| 6,773,069 B1 | 8/2004 | Kaneko et al. | |
| 6,774,625 B2 | 8/2004 | Suzuki et al. | |
| 6,786,691 B2 | 9/2004 | Alden | |
| 6,810,984 B2 | 11/2004 | Sakai et al. | |
| 6,814,370 B2 | 11/2004 | Yasui | |
| 6,849,808 B2 | 2/2005 | Enomoto et al. | |
| 6,916,997 B2 | 7/2005 | Thakur et al. | |
| 6,929,324 B2 | 8/2005 | Enomoto et al. | |
| 6,969,809 B2 * | 11/2005 | Rainey | 177/136 |
| 6,981,717 B2 | 1/2006 | Sakamoto et al. | |
| 6,994,397 B2 | 2/2006 | Young et al. | |
| 7,036,864 B2 | 5/2006 | Rehfuss et al. | |
| 7,038,146 B2 | 5/2006 | Saito et al. | |
| 7,091,426 B2 * | 8/2006 | Nagai et al. | 280/735 |
| 7,131,513 B2 | 11/2006 | Mutou et al. | |
| 7,137,665 B2 | 11/2006 | Osawa et al. | |
| 7,137,669 B2 | 11/2006 | Nagayama | |
| 7,185,867 B2 | 3/2007 | Hill et al. | |
| 7,189,931 B2 * | 3/2007 | Hida et al. | 177/144 |
| 7,195,261 B2 | 3/2007 | Yoshida et al. | |
| 7,210,358 B2 | 5/2007 | Yamazaki | |
| 7,281,766 B2 | 10/2007 | Fujita et al. | |
| 7,322,605 B2 | 1/2008 | Ventura et al. | |
| 7,328,627 B2 | 2/2008 | Kawabata et al. | |
| 7,373,846 B2 | 5/2008 | Furukawa et al. | |
| 7,422,291 B2 * | 9/2008 | Nagayama | 297/452.52 |
| 7,435,918 B2 | 10/2008 | Becker et al. | |
| 7,438,350 B1 | 10/2008 | Peterson et al. | |
| 7,455,343 B2 | 11/2008 | Endo et al. | |
| 7,488,026 B1 * | 2/2009 | Jovicevic | 296/65.13 |
| 7,510,161 B2 | 3/2009 | Fischer et al. | |
| 7,520,175 B2 | 4/2009 | Matsukawa et al. | |
| 7,604,213 B2 | 10/2009 | Choi et al. | |
| 7,614,680 B2 | 11/2009 | Endo et al. | |
| 7,729,122 B2 | 6/2010 | Wong | |
| 7,730,794 B2 | 6/2010 | Hwang et al. | |
| 7,731,281 B2 * | 6/2010 | Kurita et al. | 297/216.19 |
| 7,762,149 B2 | 7/2010 | Hwang et al. | |
| 7,762,150 B2 | 7/2010 | Kawabata et al. | |
| 7,793,557 B2 | 9/2010 | Endo et al. | |
| 7,823,951 B2 | 11/2010 | Endo et al. | |
| 7,836,997 B2 | 11/2010 | Takayasu et al. | |
| 7,870,927 B2 | 1/2011 | Endo et al. | |
| 7,878,570 B2 | 2/2011 | Endo et al. | |
| 8,002,071 B2 | 8/2011 | Endo et al. | |
| 8,011,715 B2 | 9/2011 | Endo et al. | |
| 8,028,786 B2 * | 10/2011 | Takayasu et al. | 180/273 |
| 8,051,941 B2 * | 11/2011 | Takayasu et al. | 180/273 |
| 8,136,619 B2 | 3/2012 | Hwang et al. | |
| 8,136,620 B2 | 3/2012 | Hwang et al. | |
| RE43,989 E * | 2/2013 | Furukawa et al. | 73/862.621 |
| 8,371,665 B2 | 2/2013 | Herrera et al. | |
| 8,540,047 B2 | 9/2013 | Takayasu et al. | |
| 8,548,687 B2 | 10/2013 | Jefferies et al. | |
| 2003/0168895 A1 | 9/2003 | Sakai et al. | |
| 2004/0032117 A1 | 2/2004 | Pinto et al. | |
| 2004/0100388 A1 | 5/2004 | Yoshida et al. | |
| 2004/0160113 A1 * | 8/2004 | Rehfuss et al. | 297/452.52 |
| 2005/0061643 A1 | 3/2005 | Rainey | |
| 2005/0099041 A1 | 5/2005 | Becker et al. | |
| 2005/0109909 A1 | 5/2005 | Osawa et al. | |
| 2005/0284668 A1 | 12/2005 | Hida et al. | |
| 2005/0284669 A1 | 12/2005 | DiPaola et al. | |
| 2006/0010984 A1 | 1/2006 | Yamazaki | |
| 2006/0048582 A1 | 3/2006 | Furukawa et al. | |
| 2007/0012487 A1 | 1/2007 | Becker et al. | |
| 2007/0045986 A1 | 3/2007 | Lirot | |
| 2007/0057527 A1 | 3/2007 | Endo et al. | |
| 2008/0036251 A1 | 2/2008 | Endo et al. | |
| 2008/0079296 A1 | 4/2008 | Endo et al. | |
| 2008/0084086 A1 | 4/2008 | Endo et al. | |
| 2009/0079239 A1 | 3/2009 | Endo et al. | |
| 2009/0139774 A1 | 6/2009 | Takayasu et al. | |
| 2009/0139775 A1 | 6/2009 | Takayasu et al. | |
| 2009/0294185 A1 | 12/2009 | Bruzzone et al. | |
| 2009/0301793 A1 | 12/2009 | Endo et al. | |
| 2009/0301794 A1 | 12/2009 | Endo et al. | |
| 2010/0044117 A1 | 2/2010 | Takayasu | |
| 2010/0282522 A1 | 11/2010 | Endo et al. | |
| 2011/0000719 A1 | 1/2011 | Takayasu et al. | |
| 2011/0006580 A1 | 1/2011 | Ishimoto et al. | |
| 2011/0018301 A1 | 1/2011 | Endo et al. | |
| 2011/0018302 A1 | 1/2011 | Endo et al. | |
| 2011/0073381 A1 | 3/2011 | Endo et al. | |
| 2011/0084525 A1 | 4/2011 | Endo et al. | |
| 2011/0094803 A1 | 4/2011 | Takayasu et al. | |
| 2011/0108330 A1 | 5/2011 | Endo et al. | |
| 2011/0147096 A1 | 6/2011 | Endo et al. | |
| 2011/0303469 A1 | 12/2011 | Saito et al. | |
| 2012/0000716 A1 | 1/2012 | Takayasu et al. | |
| 2012/0006601 A1 | 1/2012 | Endo et al. | |

FOREIGN PATENT DOCUMENTS

| | | |
|---|---|---|
| JP | 63-026466 U | 2/1988 |
| JP | 05-043031 U | 6/1993 |
| JP | A-08-164039 | 6/1996 |
| JP | A-09-207638 | 8/1997 |
| JP | 10-297334 A | 11/1998 |
| JP | 11-108746 A | 4/1999 |
| JP | 11-304579 A | 11/1999 |
| JP | 2000-280813 A | 10/2000 |
| JP | 2001-030819 A | 2/2001 |
| JP | A-2001-050329 | 2/2001 |
| JP | 2001-158269 A | 6/2001 |
| JP | A-2003-011709 | 1/2003 |
| JP | 2003-166872 A | 6/2003 |
| JP | 2003-237535 A | 8/2003 |
| JP | 2003-287458 A | 10/2003 |
| JP | 2004-210167 A | 7/2004 |
| JP | A-2004-268620 | 9/2004 |
| JP | A-2004-306849 | 11/2004 |
| JP | 2008-296657 A | 12/2008 |

(56) References Cited

FOREIGN PATENT DOCUMENTS

OTHER PUBLICATIONS

"What is eFunda" from eFunda Design Standards website, Copyright 2010 by eFunda, Inc. (http://www.efunda.com/about/about.cfm).*
Office Action for U.S. Appl. No. 11/992,418, mailed Jan. 13, 2011.
Office Action for U.S. Appl. No. 12/875,594, mailed Jan. 20, 2011.
Notice of Allowance for U.S. Appl. No. 12/536,124, mailed Jan. 18, 2011.
U.S. Appl. No. 12/985,932, filed Jan. 6, 2011.
U.S. Appl. No. 13/010,429, filed Jan. 20, 2011.
European Search Report for European Application No. 10007613.2 dated Oct. 9, 2010.
Notice of Allowance for U.S. Appl. No. 12/536,075, mailed Nov. 8, 2010.
U.S. Appl. No. 12/961,758, Dec. 7, 2010.
Jan. 28, 2013 Final Office Action issued in U.S. Appl. No. 13/137,713.
Nov. 29, 2011 Office Action issued in Japanese Application No. 2007-537702 (with English translation).
Nov. 30, 2011 Office Action issued in Chinese Application No. 201010552150.5 (with English translation).
Jan. 12, 2012 Office Action issued in European Application No. 10007613.2.
Feb. 11, 2013 Office Action issued in U.S. Appl. No. 13/175,565.
Apr. 9, 2012 Office Action issued in U.S. Appl. No. 13/105,483.
May 24, 2012 Second Office Action issued in Chinese Application No. 201010552150.5 with English-language translation.
Aug. 2, 2012 Office Action issued in U.S. Appl. No. 13/137,713.
Office Action issued on Jun. 6, 2011 in U.S. Appl. No. 13/039,458.
Office Action issued Jun. 7, 2011 in U.S. Appl. No. 11/992,418.
Notice of Allowance issued Jul. 29, 2011 in U.S. Appl. No. 11/992,418.
Notice of Allowance issued Jul. 13, 2011 in U.S. Appl. No. 12/875,594.
Sep. 29, 2010 Office Action issued in U.S. Appl. No. 12/588,922.
Mar. 8, 2011 Office Action issued in U.S. Appl. No. 12/588,922.
Sep. 9, 2011 Notice of Allowance issued in U.S. Appl. No. 12/961,758.
Sep. 15, 2011 Office Action issued in U.S. Appl. No. 12/985,932.
Nov. 16, 2011 Office Action issued in U.S. Appl. No. 13/010,429.
Jan. 20, 2011 Office Action issued in U.S. Appl. No. 12/875,594.
Dec. 6, 2011 Office Action issued in U.S. Appl. No. 13/039,458.
Dec. 15, 2011 Search Report issued in European Application No. 11181454.7.
Oct. 22, 2013 Office Action issued in U.S. Appl. No. 13/010,429.
Jan. 8, 2014 Office Action issued in U.S. Appl. No. 13/175,565.
Aug. 23, 2013 Office Action issued in U.S. Appl. No. 13/242,780.
Nov. 13, 2013 Office Action issued in U.S. Appl. No. 12/985,932.
Dec. 13, 2013 Office Action issued in U.S. Appl. No. 13/601,330.
Notice of Allowance for U.S. Appl. No. 12/536,151, mailed Mar. 25, 2011.
Office Action for U.S. Appl. No. 12/961,758, mailed Mar. 28, 2011.
Office Action for U.S. Appl. No. 13/010,429, mailed May 2, 2011.
Jun. 13, 2013 Office Action issued in U.S. Appl. No. 13/175,565.
Notice of Allowance for U.S. Appl. No. 11/992,418, mailed Feb. 18, 2010.
Office Action for U.S. Appl. No. 11/992,418, mailed Jun. 3, 2010.
Office Action for U.S. Appl. No. 12/536,124, mailed Jul. 1, 2010.
Office Action for U.S. Appl. No. 12/536,151, mailed Aug. 10, 2010.
Office Action for U.S. Appl. No. 12/536,075, mailed Apr. 7, 2010.
Office Action for U.S. Appl. No. 12/536,075, mailed Oct. 15, 2010.
English-language translation of Japanese Office Action in Application No. 2004-223456, mailed Aug. 3, 2010.
Office Action for U.S. Appl. No. 11/992,418, mailed Jul. 2, 2009.
U.S. Appl. No. 11/992,418.
U.S. Appl. No. 12/536,124.
U.S. Appl. No. 12/536,151.
U.S. Appl. No. 12/536,075.
Office Action for U.S. Appl. No. 12/536,151, mailed Jan. 31, 2011.
U.S. Appl. No. 13/039,458, filed Mar. 3, 2011.
May 14, 2014 Office Action issued in U.S. Appl. No. 13/010,429.

* cited by examiner

PASSENGER'S WEIGHT MEASUREMENT DEVICE FOR VEHICLE SEAT HAVING IMPROVED EASE OF ASSEMBLY

This is a Continuation of application Ser. No. 11/992,418 filed Mar. 21, 2008, which in turn is a National Stage of PCT/JP2006/319479 filed Sep. 29, 2006, which in turn claims the benefit of Japanese Application No. 2005-286881 filed Sep. 30, 2005. The disclosures of the prior applications are hereby incorporated by reference herein in their entirety.

TECHNICAL FIELD

The present invention relates to a passenger's weight measurement device for a vehicle seat, which measures a weight of a passenger seated on the vehicle seat, and to an attachment structure for attaching a load sensor to the passenger's weight measurement device.

BACKGROUND ART

In recent years, in some cases, operations of various safety devices such as a seat belt and an air bag have been controlled in accordance with a weight of a passenger seated on a vehicle seat for the purpose of enhancing performance of the safety devices. In a conventional passenger's weight measurement device that measures the weight of the seated passenger, a load sensor is interposed between a vehicle floor and the vehicle seat (for example, refer to Patent Document 1 and Patent Document 2).
Patent Document 1: JP A H8-164039
Patent Document 2: JP A H9-207638

DISCLOSURE OF THE INVENTION

Problems to be Solved by the Invention

However, there is a dimension error or an assembling position error when the passenger's weight measurement device is assembled, when the vehicle seat is fixed to the passenger's weight measurement device or when the passenger's weight measurement device is fixed to the vehicle floor, or the like. Accordingly, it has been difficult to assemble the passenger's weight measurement device.

In this connection, it is an object of the present invention to provide a passenger's weight measurement device for a vehicle seat, which is more easily assembled.

Means for Solving the Problems

In order to solve the above-described problem, a passenger's weight measurement device for a vehicle seat according to the present invention comprises: an upper rail provided on a lower rail fixed to a vehicle floor so as to be movable in a rear and front direction; a load sensor fixed onto the upper rail; and a frame provided on the load sensor and below the vehicle seat, wherein a rod is extended from the load sensor, and the rod sequentially penetrates the frame, a plain washer and a spring holder, and is inserted into a coil spring, a bush is disposed along an edge of a hole of the plain washer, though which the rod is inserted, and a step difference is formed between an upper surface of the plain washer and the bush by protruding the bush from the upper surface, and a nut is screwed to the rod from above the spring holder, and the coil spring is sandwiched between the spring holder and the frame and is compressed and an end portion of the coil spring engages with the step difference by tightening the nut to the spring holder.

Effect of the Invention

In accordance with the present invention, the frame can be shifted in the vertical direction with respect to the load sensor. Accordingly, even if the lower rail, the upper rail, the frame and the like are distorted during the assembling or the like, an initial load generated by such distortions can be prevented from being applied to the load sensor.

Moreover, the coil spring is sandwiched between the frame and the spring holder in a state of being compressed by tightening the nut. Accordingly, the load sensor is fixed to the frame more stably and appropriately. Therefore, it becomes easier to assemble the passenger's weight measurement device.

Furthermore, the load is stably applied from the coil spring to the nut owing to elastic deformation of the coil spring, which is caused by tightening the nut.

Moreover, by tightening the nut, the end portion of the coil spring engages with the step difference formed between the upper surface of the washer and the bush. Accordingly, the coil spring is centered with respect to the washer without slipping on the upper surface of the washer.

BEST MODE FOR CARRYING OUT THE INVENTION

A best mode for carrying out the present invention will be described below by using the drawings. On embodiments to be described below, a variety of technically preferable limitations are imposed in order to carry out the present invention; however, the scope of the invention is not limited to the following embodiment and illustrated examples.

Figure 1:
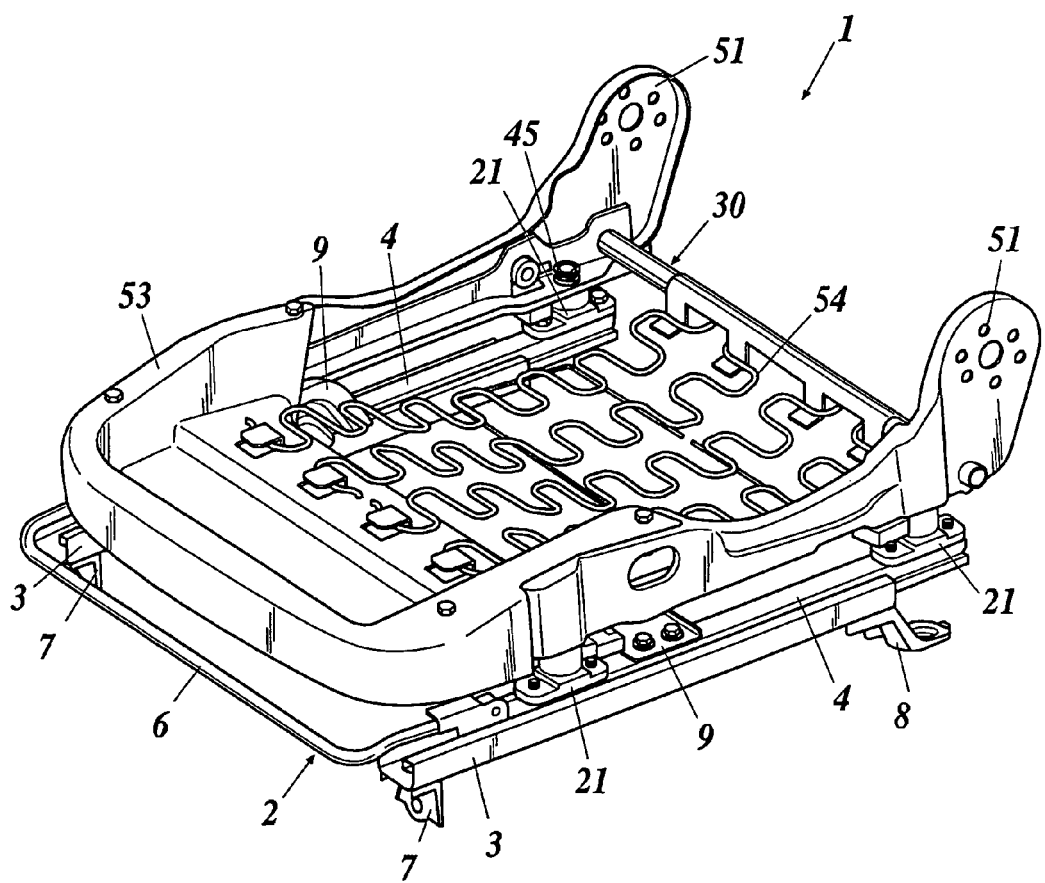
FIG. 1 This is a perspective diagram of a passenger's weight measurement device 1 for a vehicle seat.
Figure 2:
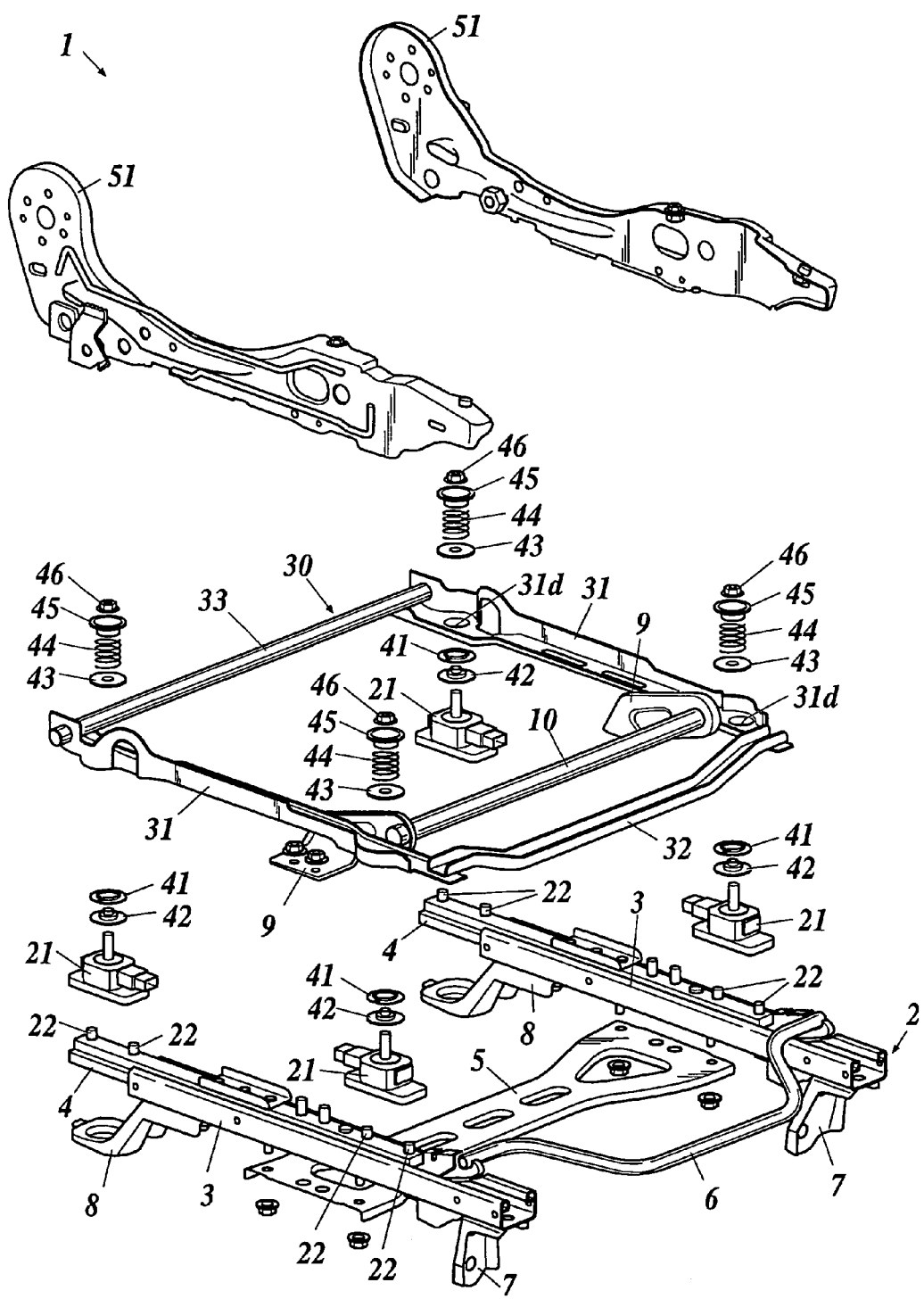
FIG. 2 This is an exploded perspective diagram of the passenger's weight measurement device 1.

FIG. 1 is a perspective diagram of a passenger's weight measurement device 1 for a vehicle seat, and FIG. 2 is an exploded perspective diagram of the passenger's weight measurement device 1.

As shown in FIG. 1 and FIG. 2, a slide adjuster 2 for adjusting a back-and-forth position of the vehicle seat is attached onto a floor of a passenger's room. The slide adjuster 2 includes a left and right pair of lower rails 3 provided in parallel to each other, a left and right pair of upper rails 4 engaged with the lower rails 3 so as to be capable of sliding on the respective lower rails 3 in a rear and front direction with respect to the lower rails 3, a lower bracket 5 fixed to lower surfaces of the lower rails 3 by bolt/nut coupling or rivet coupling and bridged between the left and right lower rails 3, a lock mechanism 6 for locking the upper rails 4 to the lower rails 3 and for releasing the locking, brackets 7 attached onto front end portions of the lower surfaces of the respective lower rails 3, and brackets 8 attached onto rear end portions of the lower surfaces of the respective lower rails 3. These brackets 7 and 8 are attached onto the vehicle floor, and the lower rails 3 are fixed to the vehicle floor.

Brackets 9 are fixed to middle positions of upper surfaces of the respective upper rails 4 in a rear and front direction by the bolt/nut coupling or the rivet coupling. The brackets 9 are provided in a state of being erected with respect to upper surfaces of the upper rails 4. A right end portion of a submarine pipe 10 is welded to the brackets 9, and the submarine pipe 10 is bridged between the two left and right brackets 9.

A load sensor 21 is mounted on a front end portion of the upper surface of the right upper rail 4, and another load sensor 21 is mounted on a rear end portion thereof. Also on the upper surface of the left upper rail 4, load sensors 21 are mounted on a front end portion and rear end portion thereof, respectively. When viewed from the above, these four load sensors 21 are arranged so as to be apexes of a square or a rectangle.

Figure 3:
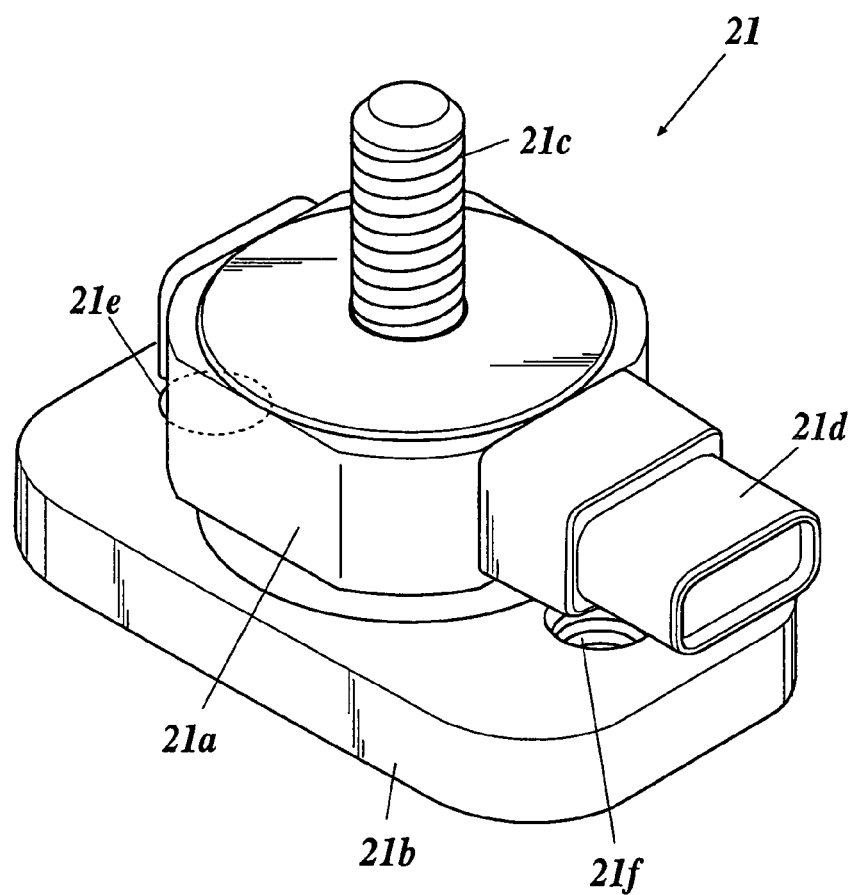
FIG. 3 This is a perspective diagram of a load sensor 21.

FIG. 3 is a perspective diagram of the load sensor 21. All of the load sensors 21 are provided in a similar way. As shown in FIG. 3, the load sensor 21 includes a columnar sensing portion 21a that senses a load, a plate-like flange portion 21b extending horizontally in a rear and front direction from a lower end of the sensing portion 21a, a rod 21c extending upward from an upper end of the sensing portion 21a, and a connector 21d extending from the sensing portion 21a so as to be parallel to the flange portion 21b. The rod 21c is formed into a male screw shape. Female screw-shaped circular holes 21e and 21f which penetrate the flange portion 21b in the vertical direction are formed in front and rear portions of the flange portion 21b, respectively. The sensing portion 21a incorporates a strain gauge therein, and the load is converted into an electric signal by the strain gauge.

As shown in FIG. 2, the load sensor 21 is fixed to the right upper rail 4. Specifically, a lower surface of the flange portion 21b abuts on the upper surface of the upper rail 4, and two bolts 22 inserted through the upper rail 4 upward from below are screwed to the circular holes 21e and 21f, respectively. Therefore, the load sensor 21 is fixed. Note that the load sensor 21 may be fixed to the upper rail 4 by fastening nuts to the bolts 22 on the flange portion 21b without forming any screw threads in the circular holes 21e and 21f.

Any load sensor 21 is fixed to the upper rails 4 as described above. However, with regard to the two load sensors 21 fixed to the rear portions thereof, the connectors 21d are directed forward, and with regard to the two load sensors 21 fixed to the front portions thereof, the connectors 21d are directed backward.

Figure 4:
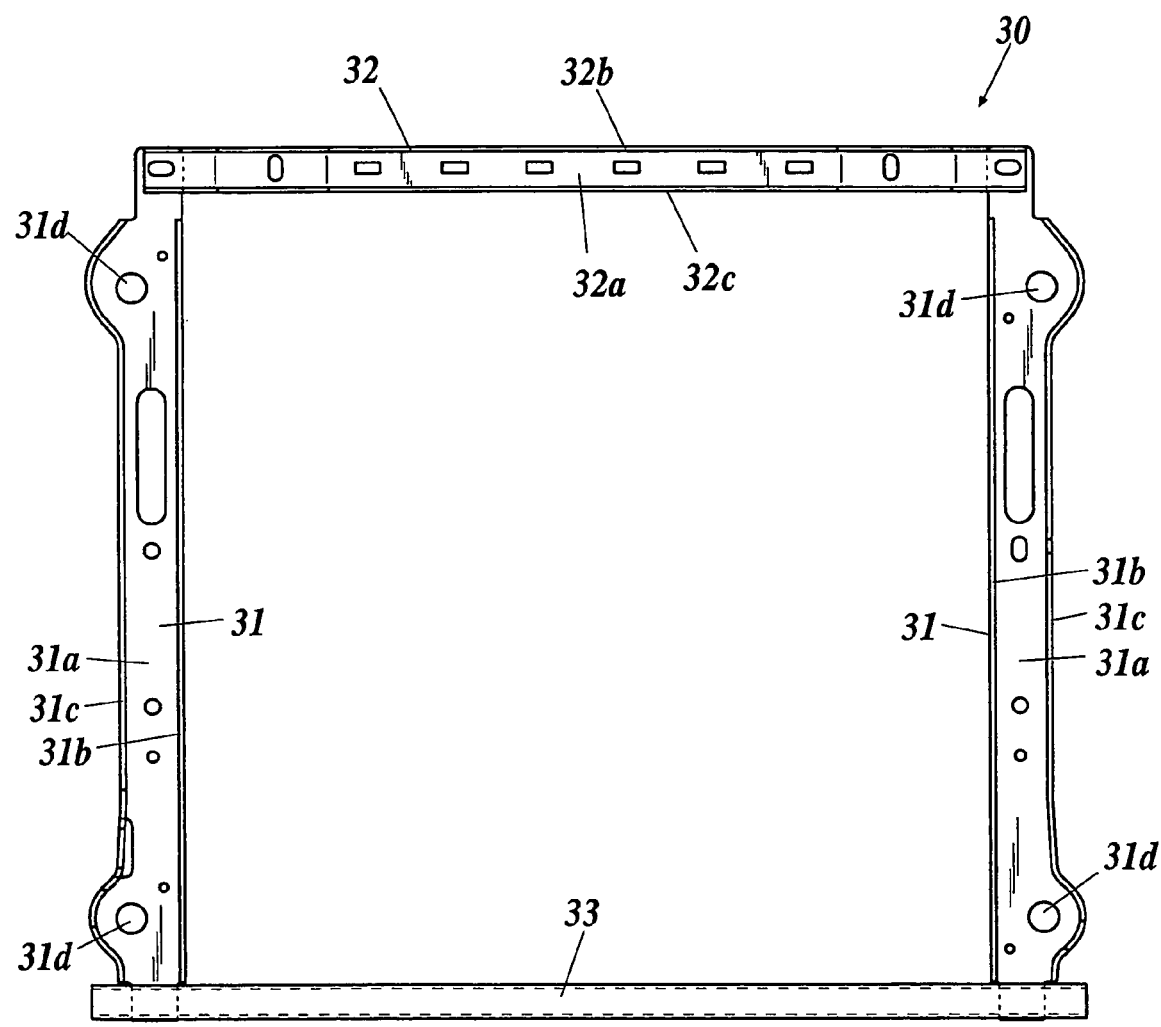
FIG. 4 This is a plan diagram of a rectangular frame 30.

As shown in FIG. 1 and FIG. 2, the frame 30 having a rectangular frame shape is mounted on these four load sensors 21. FIG. 4 is a top diagram of the rectangular frame 30. As shown in FIG. 4, the rectangular frame 30 is composed of a left and right pair of beams 31, a front beam 32, and a rear cross pipe 33.

Either of the beams 31 is a metal member having a U-shaped cross section, and has a web 31a, an inner flange 31b, and an outer flange 31c. Attachment holes 31d are formed in a front portion and a rear portion of the web 31a, respectively.

The front beam 32 is a metal member having a U-shaped cross section, and has a web 32a, a front flange 32b, and a rear flange 32c. The front beam 32 is bridged between front end portions of the left and right beams 31, and is welded to these beams 31.

The cross pipe 33 is bridged between rear end portions of the left and right beams 31, and is welded to these beams 31.

Figure 5:
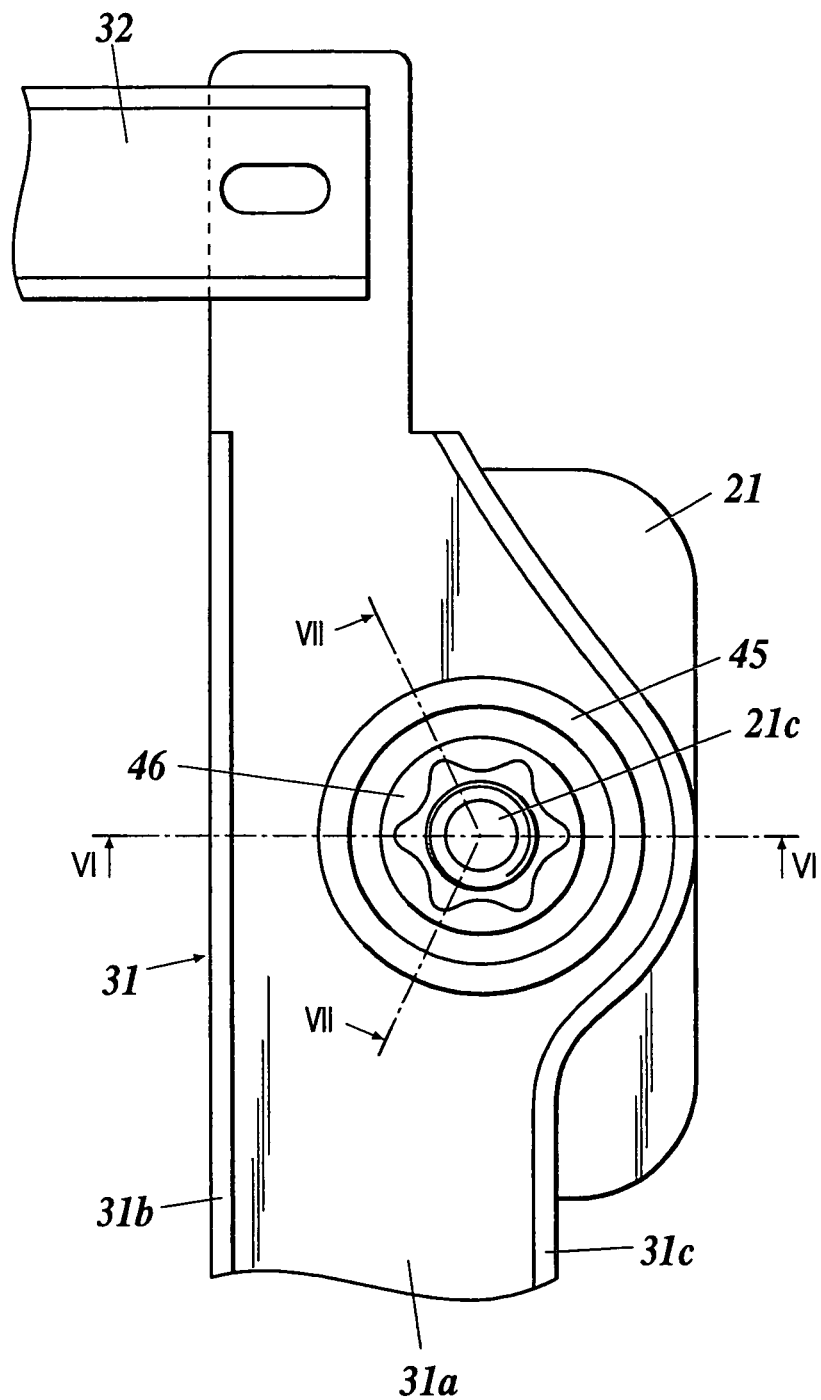
FIG. 5 This is a plan diagram of a right front portion of the rectangular frame 30.
Figure 6:
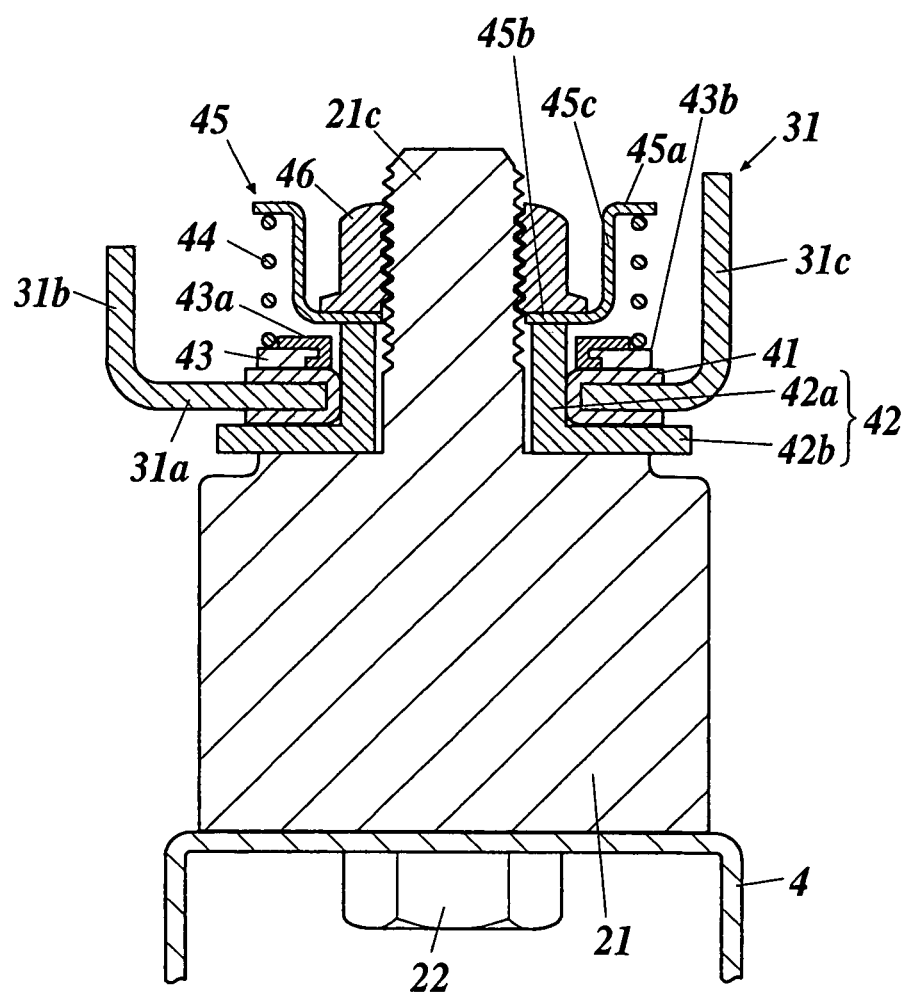
FIG. 6 This is a cross-sectional diagram showing a cross section along a line VI-VI of FIG. 5.
Figure 7:
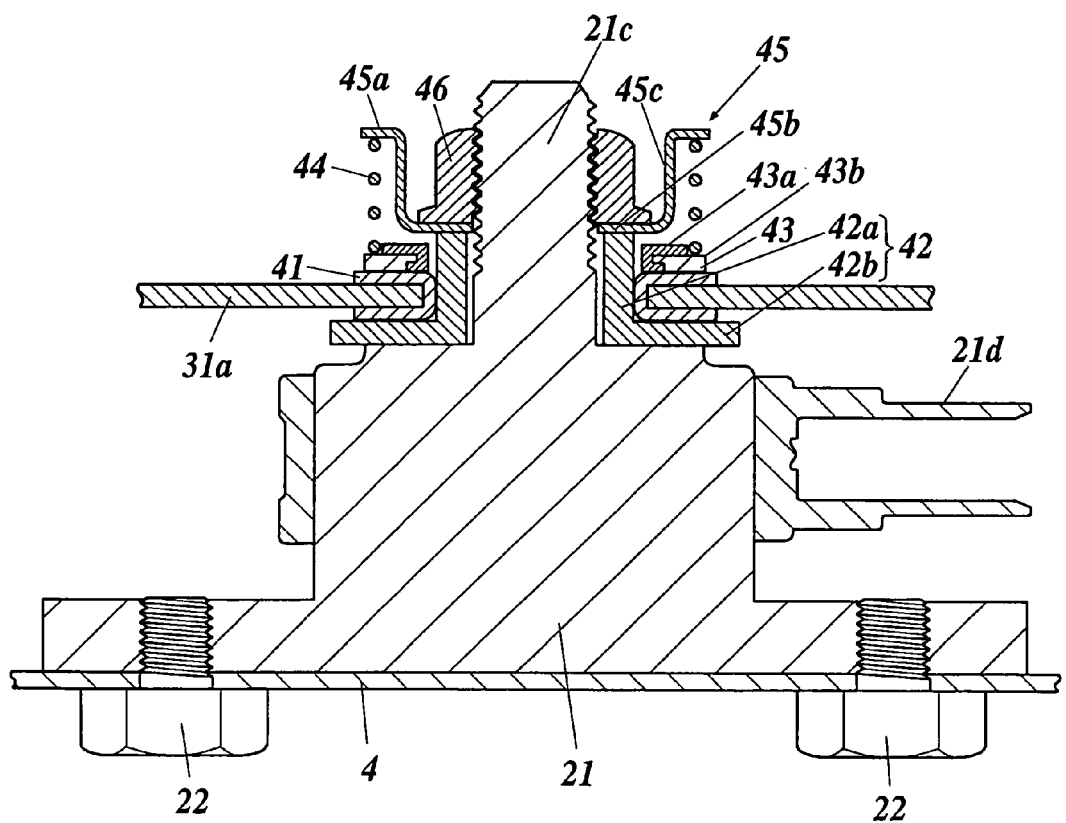
FIG. 7 This is a cross-sectional diagram showing a cross section along a line VII-VII of FIG. 5.

The rods 21c of the load sensors 21 are inserted into the respective attachment holes 21d upward from below, and nuts 46 are screwed to the rods 21c. Therefore, the load sensors 21 are attached onto a right front portion, a right rear portion, a left front portion and a left rear portion of the rectangular frame 30, respectively. Referring to FIG. 5 to FIG. 7, an attachment structure for attaching the right front load sensor 21 onto the right front portion of the rectangular frame 30 will be described. FIG. 5 is a plan diagram of the right front portion of the rectangular frame 30, FIG. 6 is a cross-sectional diagram showing a cross section along a line VI-VI, and FIG. 7 is a cross-sectional diagram showing a cross section along a line VII-VII. As shown in FIG. 5 to FIG. 7, an annular bush 41 is fitted to an edge of the right front attachment hole 31d, and grease is applied on the bush 41. The bush 41 is made of synthetic resin. Moreover, a stepped collar 42 composed of a cylindrical portion 42a and an annular plate-like flange portion 42b formed on one end surface of the cylindrical portion 42a is inserted through the attachment hole 31d in an inside of the bush 41. Here, the cylindrical portion 42a is inserted through the attachment hole 31d upward from below, and the flange portion 42b engages with a lower surface of the web 31a via the bush 41. Therefore, the stepped collar 42 is not pulled out upward. Moreover, the cylindrical portion 42a protrudes from an upper surface of the web 31a, and an upper end surface of the cylindrical portion 42a is located at a higher position than the upper surface of the web 31a. Here, the cylindrical portion 42a is fitted to the bush 41, and there is no gap between the cylindrical portion 42a and the bush 41.

The rod 21c of the load sensor 21 is inserted through the stepped collar 42 upward from below. An inner diameter of the stepped collar 42 is designed to be slightly larger than a diameter of the rod 21c, and by such designing, a dimension error and an attachment position error are solved.

The nut 46 is screwed to the rod 21c. A plain washer 43, a coil spring 44 and a spring holder 45 are interposed between the upper surface of the web 31a of the beam 31 and the nut 46. An annular bush 43a is disposed along an edge of a hole of the plain washer 43, and the edge of the hole of the plain washer 43 is sandwiched vertically by this bush. Therefore, the bush 43a is fitted to the edge of the hole of the plain washer 43. In such a way, the bush 43a and the plain washer 43 are integrated with each other. Moreover, the bush 43a protrudes from an upper surface of the plain washer 43. Therefore, a step difference 43b is formed on the upper surface of the plain washer 43 by the bush 43a. Moreover, a lower surface of the plain washer 43 and a lower surface of the bush 43a become flush with each other. Furthermore, the rod 21c is inserted through the coil spring 44, the coil spring 44 is set in a state of being mounted on the plain washer 43 on a circumference of the bush 43a, and an end portion of the coil spring 44 engages with the step difference 43b formed by the bush 43a. Therefore, the coil spring 44 is centered with respect to the plain washer 43. A portion of the coil spring 44, which is brought into contact with the plain washer 43, is formed to be flat. The bush 43a is made of synthetic resin, and a tapping sound is prevented by the bush 43a.

The spring holder 45 includes a cup portion 45c in which a through hole is formed in a bottom 45b, and an annular flange 45a formed on an outer circumferential surface in an opening of the cup portion 45c. Then, the rod 21c penetrates through the through hole of the bottom 45b of the cup portion 45c, the bottom 45b of the cup portion 45c is set in a state of being mounted on an end surface of the stepped collar 42, and the cup portion 45c is inserted into the coil spring 44. Moreover, the coil spring 44 and the plain washer 43 are set in a state of being sandwiched between the flange 45a of the spring holder 45 and the web 31a.

The nut 46 is screwed to the rod 21c in a state of being inserted into the cup portion 45c, and by tightening the nut 46, the bottom 45b of the cup portion 45c is sandwiched between the nut 46 and the upper end surface of the cylindrical portion 42a, and the coil spring 44 and the plain washer 43 are sandwiched between the flange 45a and the web 31a of the beam 31. Moreover, since the coil spring 44 is compressed by tightening the nut 46, the load is applied to the nut 46, and accordingly, the nut 46 is prevented from being loosened.

Like the right front load sensor 21, the left front, left rear and right rear load sensors 21 are attached onto the left front, left rear and right rear attachment holes 31d, respectively. In a state where the four load sensors 21 are attached onto the rectangular frame 30, the submarine pipe 10 is located behind the front beam 32.

As shown in FIG. 1 and FIG. 2, side frames 51 are welded to the outer flanges 31c of the left and right beams 31, respectively. These side frames 51 are parts of a bottom frame of the vehicle seat.

From above, front portions of the side frames 51 are covered with a pan frame 53, and the side frames 51 and the pan frame 53 are fixed to each other by the bolt/nut coupling or the rivet coupling. A seat spring 54 is bridged between the cross pipe 33 and the pan frame 53, a cushion is mounted on the pan frame 53 and the seat spring 54, and the cushion, the pan frame 53 and the side frames 51 are entirely covered with a cover.

A backrest frame is coupled to rear ends of the side frames 51, and is capable of rising and falling by a reclining mechanism. Note that the backrest frame and the cushion are not shown in order to make it easy to view the drawings.

In the passenger's weight measurement device 1 configured as described above, when a passenger is seated on a seat bottom, a weight of the passenger is applied to the four load sensors 21 through the rectangular frame 30, and is converted into electric signals by these load sensors 21.

Here, the load sensors 21 are attached between the upper rails 4 and the rectangular frame 30, and the load sensors 21 move in a rear and front direction integrally with the vehicle seat. Accordingly, a load inputted from the vehicle seat to the load sensors 21 can be always kept constant irrespective of position of the vehicle seat in a rear and front direction. Therefore, measuring accuracy of the passenger's weight can be enhanced.

Moreover, the spring holder 45 is mounted on the upper end surface of the stepped collar 42, and the coil spring 44 is sandwiched between the spring holder 45 and the web 31a by tightening the nut 46. Accordingly, the rectangular frame 30 can be shifted in the vertical direction with respect to the load sensors 21. Therefore, noise of the load generated by distortion of the slide adjuster 2 and the like becomes smaller.

Moreover, even if the rectangular frame 30 can be shifted in the vertical direction with respect to the load sensors 21, the coil springs 44 are interposed between the nuts 46 and the webs 31a, and accordingly, the load sensors 21 can be fixed to the rectangular frame 30 more stably and appropriately. Therefore, it becomes easier to assemble the passenger's weight measurement device 1.

Moreover, the load is stably applied from each of the coil springs 44 to each of the nuts 46 owing to elastic deformation of the coil spring 44, which is caused by tightening the nut 46.

Moreover, the submarine pipe 10 is located behind the front beam 32, and accordingly, when forward inertial force is applied to the passenger owing to a frontal collision or the like of the vehicle, buttocks of the passenger seated on the vehicle seat are restrained by the submarine pipe 10. Therefore, a so-called submarine phenomenon in which the passenger moves under a waist belt can be prevented.

Note that the present invention is not limited to the above-described embodiment, and various improvements and design changes can be made within the scope without departing from the gist of the present invention.

INDUSTRIAL APPLICABILITY

As described above, the present invention can be widely used, for example, for seats of an automobile, an electric train and other vehicles.

The invention claimed is:

1. A passenger weight measurement device for a vehicle seat, comprising:
   right and left frame members configured to support the vehicle seat and extend along a front-and-rear axis,
   a first attachment portion and a second attachment portion located in a first portion and a second portion of at least one of the right and left frame members, respectively, the first and second attachment portions being provided with a first load sensor and a second load sensor, respectively, and
   a first elastic member provided between the first attachment portion and a first holding member and a second elastic member provided between the second attachment portion and a second holding member, the first and second elastic members being compressed, and the first and second holding members being respectively provided at the first load sensor and the second load sensor,
   wherein the first portion and the second portion are wider along a right-and-left axis than a middle portion of the at least one frame member,
   wherein the middle portion is between the first portion and the second portion,
   wherein the first and second attachment portions and the at least one frame member are formed as a single member,
   wherein at least one projecting wall projecting along an up-and-down axis is formed on at least one of the first and second attachment portions, the at least one projecting wall and the at least one of the first and second attachment portions being formed as a single member,
   wherein the at least one projecting wall and the at least one frame member are formed as a single member,
   wherein the right-and-left axis is perpendicular to the front-and-rear axis,
   wherein first and second rod portions respectively project from the first and second load sensors,
   wherein the first elastic member and the first holding member are arranged between the first rod portion and the first attachment portion, and
   wherein the second elastic member and the second holding member are arranged between the second rod portion and the second attachment portion.

2. The passenger weight measurement device as claimed in claim 1, wherein the first and second attachment portions are formed in first and second extending portions, respectively, the first and second extending portions extending from the at least one frame member in the right direction or the left direction.

3. The passenger weight measurement device as claimed in claim 2, wherein the first extending portion and the second extending portion extend in a same direction.

4. The passenger weight measurement device as claimed in claim 2, wherein a said extending portion of one frame member of the right and left frame members extends in one direction of the right and left directions, and a said extending portion of the other frame member of the right and left frame members extends in an opposite direction to the one direction.

5. The passenger weight measurement device as claimed in claim 2, wherein the first extending portion is longer along the front-and-rear axis than the second extending portion.

6. The passenger weight measurement device as claimed in claim 2, wherein the first extending portion comprises an edge part that extends in an extending direction and comprises a base part, the edge part being narrower along the front-and-rear axis than the base part.

7. The passenger weight measurement device as claimed in claim 2, wherein an upper surface of the first extending portion is larger than an upper surface of the second extending portion.

8. The passenger weight measurement device as claimed in claim 2, wherein the first extending portion has a different length along the front-and-rear axis than the second extending portion.

9. The passenger weight measurement device as claimed in claim 2, wherein an upper surface of the first extending portion is longer along the front-and-rear axis than an upper surface of the second extending portion.

10. The passenger weight measurement device as claimed in claim 2, wherein a projecting part that projects upwardly is formed on at least one of the first and second extending portions,
wherein a first projecting wall of the at least one projecting wall and a second projecting wall of the at least one projecting wall are formed in a substantially rounded shape on the first attachment portion and the second attachment portion, respectively, the first projecting wall and the second projecting wall being connected to each other via an extending wall that extends upwardly.

11. The passenger weight measurement device as claimed in claim 10, wherein the first projecting wall and the second projecting wall are formed so as to partially enclose the first and second load sensors, respectively.

12. The passenger weight measurement device as claimed in claim 10, wherein the first and second projecting walls are formed in a substantial U-shape as viewed from above so as to respectively partially enclose the first and second load sensors.

13. The passenger weight measurement device as claimed in claim 12, wherein the first and second projecting walls formed in the substantial U-shape are continuous.

14. A passenger weight measurement device for a vehicle seat, comprising:
right and left frame members configured to support the vehicle seat and extend along a front-and-rear axis,
a first attachment portion and a second attachment portion located in a first portion and a second portion of at least one of the right and left frame members, respectively, the first and second attachment portions being provided with a first load sensor and a second load sensor, respectively,
a first elastic member provided between the first attachment portion and a first holding member and a second elastic member provided between the second attachment portion and a second holding member, the first and second elastic members being compressed, and the first and second holding members being respectively provided at the first load sensor and the second load sensor,
wherein the first and second attachment portions and the at least one frame member are formed as a single member,
wherein the at least one frame member has a concave portion located between the first attachment portion and the second attachment portion,
wherein the first and second attachment portions and the at least one frame member are formed as a single member,
wherein at least one projecting wall projecting along an up-and-down axis is formed on at least one of the first and second attachment portions, the at least one projecting wall and the at least one of the first and second attachment portions being formed as a single member,
wherein the at least one projecting wall and the at least one frame member are formed as a single member,
wherein first and second rod portions respectively project from the first and second load sensors,
wherein the first elastic member and the first holding member are arranged between the first rod portion and the first attachment portion, and
wherein the second elastic member and the second holding member are arranged between the second rod portion and the second attachment portion.

15. The passenger weight measurement device as claimed in claim 14, wherein the concave portion is provided at an outer surface of the at least one frame member.

16. The passenger weight measurement device as claimed in claim 14, wherein the concave portion is provided at a side of the projecting wall opposite to an attachment base member of right and left attachment base members that are attached to a vehicle side and that extend along the front-and-rear axis.

17. The passenger weight measurement device as claimed in claim 16, wherein each of the right and left attachment base members comprises a fixed rail fixed to the vehicle side and a movable rail disposed to be movable along the front-and-rear axis on the fixed rail.

18. The passenger weight measurement device as claimed in claim 14, wherein a first connecting member configured to connect the right and left frame members is provided on a rear side of the concave portion.

19. The passenger weight measurement device as claimed in claim 18, wherein the first connecting member is directly connected with the second attachment portion of the at least one frame member.

20. The passenger weight measurement device as claimed in claim 14, wherein a second connecting member configured to connect the right and left frame members is provided on a front side of the concave portion.

21. The passenger weight measurement device as claimed in claim 20, wherein the second connecting member is directly connected with the first attachment portion of the at least one frame member.

22. The passenger weight measurement device as claimed in claim 20, wherein a bent portion is formed in each end portion of the second connecting member.

23. The passenger weight measurement device as claimed in claim 17, wherein a third connecting member configured to connect the right and left attachment base members is provided on a side of the projecting wall opposite to the concave portion.

24. The passenger weight measurement device as claimed in claim 14, wherein an elongated hole that is elongated along the front-and-rear axis is formed in the at least one frame member, the elongated hole being provided on a side of the projecting wall opposite to the concave portion.

25. The passenger weight measurement device as claimed in claim 17, further comprising a lock mechanism configured to lock each movable rail of the attachment base members to each fixed rail of the attachment base members, wherein an end portion of an operating lever member configured to release a locking condition of the movable rail and the first attachment portion are arranged along the front-and-rear axis along the attachment base member of the attachment base members.

26. The passenger weight measurement device as claimed in claim 1, further comprising right and left attachment base members, each attachment base member including a fixed rail fixed to a vehicle side and a movable rail disposed to be movable along the front-and-rear axis on the fixed rail, and a lock mechanism configured to lock each movable rail of the attachment base members to a respective said fixed rail of the attachment base members, wherein an end portion of an operating lever member configured to release a locking condition of the movable rail and the first attachment portion are arranged along the front-and-rear axis along an attachment base member of the attachment base members.

27. A passenger weight measurement device for a vehicle seat, comprising:

right and left rail members, each of the rail members comprising a fixed rail fixed to a vehicle side and a movable rail disposed to be movable along a front-and-rear axis on the fixed rail;

right and left frame members that are provided on the right and left rail members, respectively, and that extend along the front-and-rear axis along the right and left rail members, a front attachment portion and a rear attachment portion located in a front portion and a rear portion of at least one of the right and left frame members, respectively, the front and rear attachment portions being respectively attached to a front load sensor and a rear load sensor, a front elastic member provided between the front attachment portion and a front holding member and a rear elastic member provided between the rear attachment portion and a rear holding member, the front and rear elastic members being compressed, and the front and rear holding members being respectively provided at the front load sensor and the rear load sensor, wherein the front portion and the rear portion of the at least one frame member are wider along a right-and-left axis than a middle portion of the at least one frame member, the middle portion being between the front portion and the rear portion, wherein the front attachment portion and the rear attachment portion are formed in front and rear extending portions, respectively, the front and rear extending portions extending from the at least one frame member in a right direction or a left direction, the right-and-left axis being perpendicular to the front-and-rear axis, wherein the front extending portion and the rear extending portion of the at least one frame member extend in a same direction, wherein the at least one frame member is connected to a side frame of right and left side frames on a side of the at least one frame member from which each of the front and rear extending portions extends, wherein the front and rear attachment portions and the at least one frame members are formed as a single member, wherein at least one projecting wall projecting along an up-and-down axis is formed on at least one of the front and rear attachment portions, the at least one projecting wall and the at least one of the front and rear attachment portions being formed as a single member, wherein the side frame is connected to a surface of the at least one frame member on a side of the projecting wall opposite to the front and rear load sensors, wherein front and rear rod portions respectively project from the front and rear load sensors, wherein the front elastic member and the front holding member are arranged between the front rod portion and the front attachment portion, and wherein the rear elastic member and the rear holding member are arranged between the rear rod portion and the rear attachment portion.

28. The passenger weight measurement device as claimed in claim 27, further comprising a pan frame configured to connect front side frame portions of the right and left side frames, wherein a spring is attached to the pan frame, and wherein the front attachment portion and the rear attachment portion are provided at an outer side of the spring.

29. The passenger weight measurement device as claimed in claim 28, further comprising a first connecting member configured to connect the right and left frame members, the first connecting member being connected with the rear attachment portion of the at least one frame member, wherein a backseat frame is connected to the right and left side frames rearward of the first connecting member and above the first connecting member.

30. The passenger weight measurement device as claimed in claim 27, wherein the front extending portion has a different length along the front-and-rear axis than the rear extending portion.

31. The passenger weight measurement device as claimed in claim 27, wherein a projecting part that projects upwardly is formed on at least one of the front and rear extending portions, wherein a front projecting wall of the at least one projecting wall and a rear projecting wall of the at least one projecting wall are formed in a substantially rounded shape on the front attachment portion and the rear attachment portion, respectively, the front projecting wall and the rear projecting wall being connected to each other via an extending wall that extends upwardly.

32. The passenger weight measurement device as claimed in claim 31, wherein the front projecting wall and the rear projecting wall are formed so as to partially enclose the front and rear load sensors.

33. The passenger weight measurement device as claimed in claim 27, wherein the extending portion of one frame member of the right and left frame members extends in one direction of the right and left directions, and the extending portion of the other frame member of the right and left frame members extends in an opposite direction to the one direction.

34. A passenger weight measurement device for a vehicle seat, comprising:

right and left frame members configured to support the vehicle seat and extend along a front-and-rear axis, and at least one attachment portion located in at least one of the right and left frame members, wherein a first portion and a second portion of the at least one frame member are wider along a right-and-left axis than a middle portion of the at least one frame member, wherein at least one elastic member is provided between at least one said attachment portion and at least one holding member, the at least one elastic member being compressed and the at least one holding member being provided at at least one load sensor, wherein the middle portion is between the first portion and the second portion, wherein the at least one said attachment portion and the at least one frame member are formed as one member,
wherein at least one projecting wall projecting along an up-and-down axis and the at least one said attachment portion are formed as one member,
wherein the at least one projecting wall and the at least one frame member are formed as one member,
wherein an extending wall extending along the up-and-down axis and the at least one frame member are formed as one member,
wherein the at least one projecting wall is connected to the extending wall so as to form the at least one projecting wall and the extending wall as one member,
wherein the right-and-left axis is perpendicular to the front-and-rear axis,
wherein at least one rod portion projects from the at least one load sensor, and
wherein the at least one elastic member and the at least one holding member are arranged between the at least one rod portion and the at least one said attachment portion.

35. The passenger weight measurement device as claimed in claim 34, wherein the at least one said attachment portion is formed in at least one extending portion, the at least one extending portion extending from the at least one frame member in the right direction or the left direction.

36. The passenger weight measurement device as claimed in claim 35, wherein an extending portion of the at least one extending portion has a different length along the front-and-rear axis than another extending portion of the at least one extending portion.

37. The passenger weight measurement device as claimed in claim 35, wherein a projecting part that projects upwardly is formed on the at least one extending portion.

38. The passenger weight measurement device as claimed in claim 1, further comprising:
right and left fixed rail members that are fixable to a vehicle, and right and left movable rail members that are disposed to be movable in a longitudinal direction of the right and left fixed rail members,
wherein the right and left frame members and the right and left movable rail members are different members from each other, and the right and left frame members are disposed above the right and left movable rail members.

39. The passenger weight measurement device as claimed in claim 14, further comprising:
right and left fixed rail members that are fixable to a vehicle, and right and left movable rail members that are disposed to be movable in a longitudinal direction of the right and left fixed rail members,
wherein the right and left frame members and the right and left movable rail members are different members from each other, and the right and left frame members are disposed above the right and left movable rail members.

40. The passenger weight measurement device as claimed in claim 27, wherein the right and left frame members and the right and left movable rail members are different members from each other, and the right and left frame members are disposed above the right and left movable rail members.

41. The passenger weight measurement device as claimed in claim 1,
wherein the first and second rod portions respectively project from the first and second load sensors along the up-and-down axis and respectively extend through first and second holes respectively formed in the first and second attachment portions, the first and second rod portions being attached to the respective first and second attachment portions.

42. The passenger weight measurement device as claimed in claim 14,
wherein the first and second rod portions respectively project from the first and second load sensors along the up-and-down axis and respectively extend through first and second holes respectively formed in the first and second attachment portions, the first and second rod portions being attached to the respective first and second attachment portions.

43. The passenger weight measurement device as claimed in claim 27,
wherein the front and rear rod portions respectively project from the front and rear load sensors along the up-and-down axis and respectively extend through front and rear holes respectively formed in the front and rear attachment portions, the front and rear rod portions being attached to the respective front and rear attachment portions.

44. The passenger weight measurement device as claimed in claim 34,
wherein the at least one rod portion projects from the at least one load sensor along the up-and-down axis and extends through a hole formed in the at least one attachment portion, the at least one rod portion being attached to the at least one attachment portion.

45. The passenger weight measurement device as claimed in claim 34,
wherein first and second rod-shaped screw portions respectively projecting from first and second load sensors of the at least one load sensor along the up-and-down axis respectively extend through first and second holes formed in the respective first and second attachment portions of the at least one attachment portion, the first and second rod-shaped screw portions being fastened to the respective first and second attachment portions by nut members.

46. The passenger weight measurement device as claimed in claim 1, wherein the at least one projecting wall and a projecting part that projects upwardly are formed as one member on the at least one of the first and second attachment portions so as to face each other across a load sensor of the first and second load sensors.

47. The passenger weight measurement device as claimed in claim 14, wherein the at least one projecting wall and a projecting part that projects upwardly are formed as one member on at least one of the first and second attachment portions so as to face each other across a load sensor of the first and second load sensors.

48. The passenger weight measurement device as claimed in claim 27, wherein the at least one projecting wall and a projecting part that projects upwardly are formed as one member on at least one of the front and rear attachment portions so as to face each other across a load sensor of the front and rear load sensors.

49. The passenger weight measurement device as claimed in claim 34, wherein the at least one projecting wall and a projecting part that projects upwardly are formed as one member on the at least one attachment portion so as to face each other across the at least one said load sensor.

50. The passenger weight measurement device as claimed in claim 1,
wherein an end portion along the right-and-left axis of at least one of the first and second attachment portions is formed in a substantially rounded shape.

51. The passenger weight measurement device as claimed in claim 14, wherein an end portion along the right-and-left axis of at least one of the first and second attachment portions is formed in a substantially rounded shape.

52. The passenger weight measurement device as claimed in claim 27,
wherein an end portion along the right-and-left axis of at least one of the front and rear attachment portions is formed in a substantially rounded shape.

53. The passenger weight measurement device as claimed in claim 34,
wherein an end portion along the right-and-left axis of the at least one attachment portion is formed in a substantially rounded shape.

54. The passenger weight measurement device as claimed in claim 1,
wherein an end portion along the right-and-left axis of at least one of the first and second attachment portions is formed in a substantially rounded shape as viewed from above,
wherein at least one said projecting wall is formed in a substantially rounded shape when viewed from above, and
wherein the at least one said projecting wall and the end portion are formed as one member.

55. The passenger weight measurement device as claimed in claim 14,
wherein an end portion along the right-and-left axis of at least one of the first and second attachment portions is formed in a substantially rounded shape as viewed from above,
wherein at least one said projecting wall is formed in a substantially rounded shape when viewed from above, and
wherein the at least one said projecting wall and the end portion are formed as one member.

56. The passenger weight measurement device as claimed in claim 27,
wherein an end portion along the right-and-left axis of at least one of the front and rear attachment portions is formed in a substantially rounded shape as viewed from above,
wherein at least one said projecting wall is formed in a substantially rounded shape when viewed from above, and
wherein the at least one said projecting wall and the end portion are formed as one member.

57. The passenger weight measurement device as claimed in claim 34,
wherein an end portion along the right-and-left axis of the at least one attachment portion is formed in a substantially rounded shape as viewed from above,
wherein at least one said projecting wall is formed in a substantially rounded shape as viewed from above, and
wherein the at least one said projecting wall and the end portion are formed as one member.

58. The passenger weight measurement device as claimed in claim 14,
wherein the first and second attachment portions are formed in first and second extending portions, respectively, the first and second extending portions extending from the at least one frame member in the right direction or the left direction,
wherein a projecting part that projects upwardly is formed on at least one of the first and second extending portions,
wherein a first projecting wall of the at least one projecting wall and a second projecting wall of the at least one projecting wall are formed in a substantially rounded shape on the first attachment portion and the second attachment portion, respectively, and
wherein the first projecting wall and the second projecting wall are connected to each other via an extending wall that extends upwardly.

59. The passenger weight measurement device as claimed in claim 34,
wherein the at least one attachment portion is formed in at least one extending portion, the at least one extending portion extending from the at least one frame member in the right direction or the left direction,
wherein a projecting part that projects upwardly is formed on the at least one extending portion,
wherein a first projecting wall of the at least one projecting wall is formed in a substantially rounded shape on the attachment portion, and
wherein the first projecting wall and a second projecting wall of the at least one projecting wall are connected to each other via the extending wall.

60. The passenger weight measurement device as claimed in claim 1, wherein an inner side of each of the first and second elastic members is disposed more toward an outside of the passenger weight measurement device than an outer side of the projecting wall.

61. The passenger weight measurement device as claimed in claim 14, wherein an inner side of each of the first and second elastic members is disposed more toward an outside of the passenger weight measurement device than an outer side of the projecting wall.

62. The passenger weight measurement device as claimed in claim 27, wherein an inner side of each of the front and rear elastic members is disposed more toward an outside of the passenger weight measurement device than an outer side of the projecting wall.

63. The passenger weight measurement device as claimed in claim 34, wherein an inner side of the at least one elastic member is disposed more toward an outside of the passenger weight measurement device than an outer side of the at least one projecting wall.

64. The passenger weight measurement device as claimed in claim 1, wherein an inner side of a nut that is screwed to one of the first and second rod portions is disposed more toward an outside of the passenger weight measurement device than an outer side of the at least one projecting wall.

65. The passenger weight measurement device as claimed in claim 14, wherein an inner side of a nut that is screwed to one of the first and second rod portions is disposed more toward an outside of the passenger weight measurement device than an outer side of the at least one projecting wall.

66. The passenger weight measurement device as claimed in claim 27, wherein an inner side of a nut that is screwed to one of the front and rear rod portions is disposed more toward an outside of the passenger weight measurement device than an outer side of the at least projecting wall.

67. The passenger weight measurement device as claimed in claim 34, wherein an inner side of a nut that is screwed to a said at least one rod portion is disposed more toward an outside of the passenger weight measurement device than an outer side of a said projecting wall.

68. The passenger weight measurement device as claimed in claim 1, wherein at least one said projecting wall and a nut that is screwed to one of the first and second rod portions are disposed so as to intersect a same plane that is orthogonal to a shaft line of the rod that extends from the one of the first and second load sensors.

69. The passenger weight measurement device as claimed in claim 14, wherein at least one said projecting wall and a nut that is screwed to one of the first and second rod portions are disposed so as to intersect a same plane that is orthogonal to a shaft line of the rod that extends from the one of the first and second load sensors.

70. The passenger weight measurement device as claimed in claim 27, wherein at least one said projecting wall and a nut that is screwed to one of the front and rear rod portions are disposed so as to intersect a same plane that is orthogonal to a shaft line of the rod that extends from the one of the front and rear load sensors.

71. The passenger weight measurement device as claimed in claim 34, wherein at least one said projecting wall and a nut that is screwed to a said at least one rod portion are disposed so as to intersect a same plane that is orthogonal to a shaft line of the rod that extends from the at least one said load sensor.

72. The passenger weight measurement device as claimed in claim 1, wherein the first elastic member is provided between the first attachment portion and the first load sensor and the second elastic member is provided between the second attachment portion and the second load sensor, and
wherein the first and second elastic members are held between the first and second load sensors and the first and second attachment portions by the first and second holding members, the first and second holding members regulating radial positions of the first and second elastic members.

73. The passenger weight measurement device as claimed in claim 1, wherein each of the right and left frame members includes a first movable frame member, a second movable frame member, and a lower rail, the first and second movable frame members being configured to move with respect to the lower rail.

74. The passenger weight measurement device as claimed in claim 73,
wherein one end of the first load sensor and one end of the second load sensor are attached to the first movable frame member of the at least one of the right and left frame members, and
wherein an other end of the first load sensor and an other end of the second load sensor are attached to the second movable frame member of the at least one of the right and left frame members.

75. The passenger weight measurement device as claimed in claim 74,
wherein the at least one projecting wall and the at least one of the first and second attachment portions are formed integrally, and
wherein the at least one projecting wall and the at least one of the first and second attachment portions are attached to at least one of the first and second movable frame members of the at least one of the right and left frame members.

76. The passenger weight measurement device as claimed in claim 1,
wherein the at least one projecting wall extends in a direction non-parallel to the front-and-rear axis as viewed from above.

77. The passenger weight measurement device as claimed in claim 75,
wherein the at least one projecting wall extends in a direction non-parallel to the front-and-rear axis as viewed from above.

78. A method of using a passenger weight measurement device for a vehicle seat, the method comprising:
fixing the passenger weight measurement device of claim 1 to a vehicle.

79. A method of using a passenger weight measurement device for a vehicle seat, the method comprising:
fixing the passenger weight measurement device of claim 14 to a vehicle.

80. A method of using a passenger weight measurement device for a vehicle seat, the method comprising:
fixing the passenger weight measurement device of claim 27 to a vehicle.

81. A method of using a passenger weight measurement device for a vehicle seat, the method comprising:
fixing the passenger weight measurement device of claim 34 to a vehicle.

82. A method of assembling a passenger weight measurement device for a vehicle seat comprising right and left frame members that are configured to support the vehicle seat and that extend along a front-and-rear axis, the method comprising:
respectively attaching a first load sensor and a second load sensor to a first attachment portion and a second attachment portion that each constitute a single member with, and that are respectively located in, a first portion and a second portion of at least one of the right and left frame members, the first portion and the second portion being wider along a right-and-left axis perpendicular to the front-and-rear axis than a middle portion of the at least one frame member that is located between the first portion and the second portion; and
attaching (1) a first elastic member between the first attachment portion and a first holding member of the first load sensor and (2) a second elastic member between the second attachment portion and a second holding member of the second load sensor (a) so that the first and second elastic members are compressed, (b) so that the first elastic member and the first holding member are arranged between a first rod portion projecting from the first load sensor and the first attachment portion, and (c) so that the second elastic member and the second holding member are arranged between a second rod portion projecting from the second load sensor and the second attachment portion,
wherein at least one projecting wall projecting along an up-and-down axis is located on at least one of the first and second attachment portions, the at least one projecting wall and the at least one of the first and second attachment portions constituting a single member.

83. A method of assembling a passenger weight measurement device for a vehicle seat comprising right and left frame members that are configured to support the vehicle seat and that extend along a front-and-rear axis, the method comprising:
respectively attaching a first load sensor and a second load sensor at a first attachment portion and a second attachment portion that each constitute a single member with, and that are respectively located in, a first portion and a second portion of at least one of the right and left frame members, a concave portion of the at least one frame member being located between the first attachment portion and the second attachment portion; and
attaching (1) a first elastic member between the first attachment portion and a first holding member of the first load sensor and (2) a second elastic member between the second attachment portion and a second holding member of the second load sensor (a) so that the first and second elastic members are compressed, (b) so that the first elastic member and the first holding member are arranged between a first rod portion projecting from the first load sensor and the first attachment portion, and (c)

so that the second elastic member and the second holding member are arranged between a second rod portion projecting from the second load sensor and the second attachment portion, wherein at least one projecting wall projecting along an up-and-down axis is located on at least one of the first and second attachment portions, the at least one projecting wall and the at least one of the first and second attachment portions constituting a single member, and the at least one projecting wall and the at least one frame member constituting a single member.

84. A method of assembling a passenger weight measurement device for a vehicle seat comprising right and left frame members disposed on right and left rail members so that the right and left frame members extend along a front-and-rear axis along the right and left rail members, each of the rail members comprising a fixed rail fixable to a vehicle side and a movable rail disposed to be movable along the front-and-rear axis on the fixed rail, the method comprising:

respectively attaching a front load sensor and a rear load sensor to a front attachment portion and a rear attachment portion that each constitute a single member with at least one of the right and left frame members and that are located, respectively, in a front extending portion of a front portion and a rear extending portion of a rear portion of the at least one frame member, the front and rear extending portions extending from the at least one frame member in the same direction of a right direction or a left direction, the front portion and the rear portion being wider along a right-and-left axis perpendicular to the front-and-rear axis than a middle portion of the at least one frame member that is between the front portion and the rear portion;

attaching (1) a front elastic member between the front attachment portion and a front holding member of the front load sensor and (2) a rear elastic member between the rear attachment portion and a rear holding member of the rear load sensor (a) so that the front and rear elastic members are compressed, (b) so that the front elastic member and the front holding member are arranged between a front rod portion projecting from the front load sensor and the front attachment portion, and (c) so that the rear elastic member and the rear holding member are arranged between a rear rod portion projecting from the rear load sensor and the rear attachment portion; and connecting the at least one frame member to a side frame of right and left side frames on a side of the at least one frame member from which each of the front and rear extending portions extends, wherein at least one projecting wall projecting along an up-and-down axis is formed on at least one of the front and rear attachment portions, the at least one projecting wall and the at least one of the front and rear attachment portions constituting a single member, and wherein the side frame is connected to a surface of the at least one frame member on a side of the at least one projecting wall opposite to the front and rear load sensors.

85. A method of assembling a passenger weight measurement device for a vehicle seat comprising right and left frame members configured to support the vehicle seat and to extend along a front-and-rear axis, the method comprising:

forming, as one member, (a) at least one projecting wall projecting along an up-and-down axis and (b) at least one attachment portion that is formed as one member with, and that is located in, at least one of the right and left frame members, the at least one frame member comprising a first portion and a second portion that are wider along a right-and-left axis perpendicular to the front-and-rear axis than a middle portion of the at least one frame member located between the first portion and the second portion;

forming, as one member, (a) an extending wall extending along an up-and-down axis and (b) the at least one frame member so that the at least one projecting wall and the extending wall constitute one member; and attaching at least one elastic member between the at least one attachment portion and at least one holding member of at least one load sensor (a) so that the at least one elastic member is compressed, and (b) so that the at least one elastic member and the at least one holding member are arranged between at least one rod portion projecting from the at least one load sensor and the at least one attachment portion.

* * * * *